Dec. 17, 1946. H. C. DAUPHINAIS 2,412,603
COVER FOR TIN CANS
Original Filed March 20, 1940
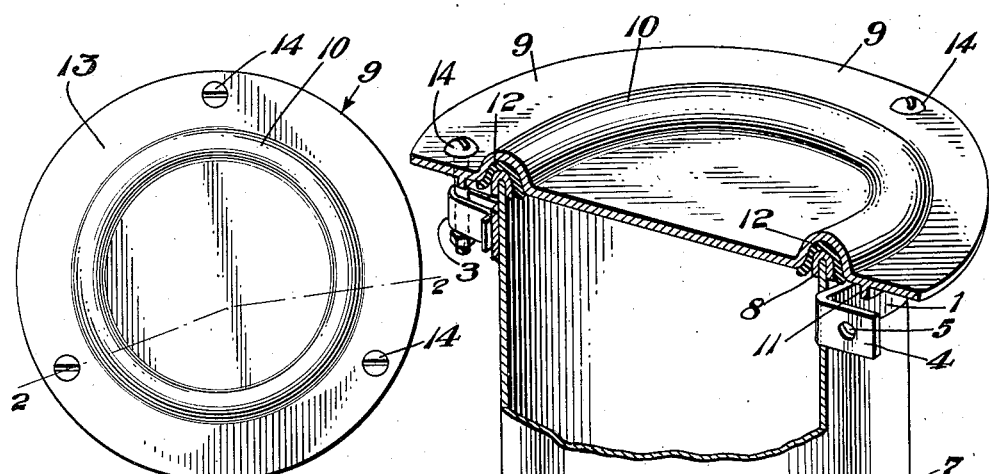
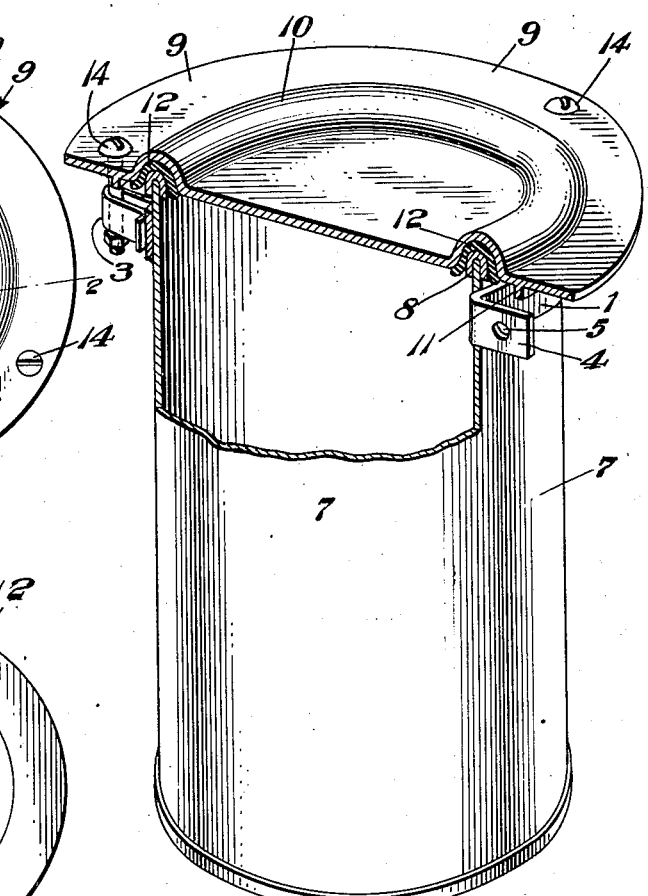
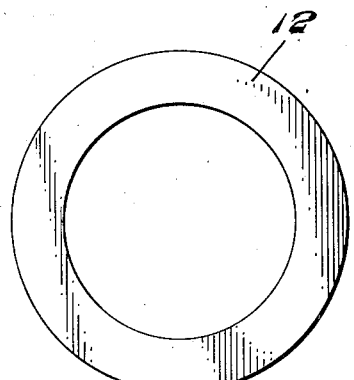
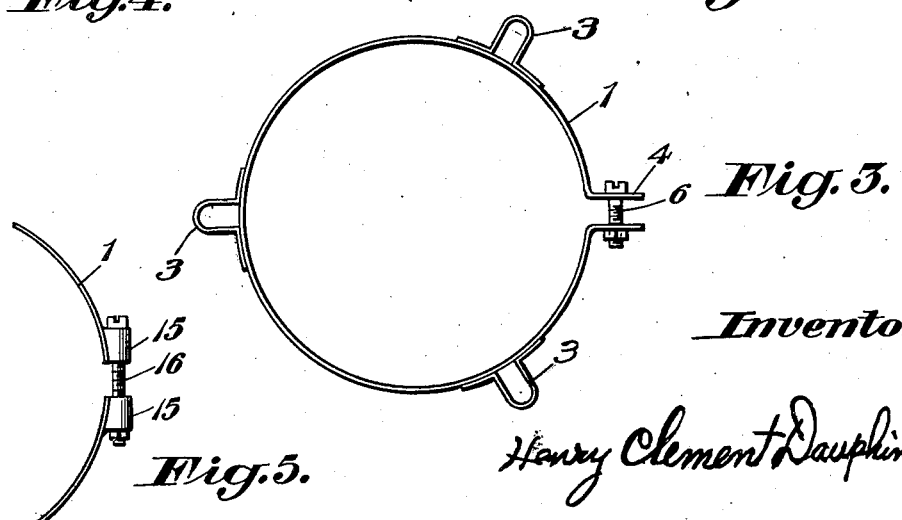
Inventor.
Henry Clement Dauphinais Patented Dec. 17, 1946

2,412,603

UNITED STATES PATENT OFFICE 2,412,603

COVER FOR TIN CANS

Henry Clement Dauphinais, Valley City, N. Dak.

Substitute for abandoned application Serial No. 324,918, March 20, 1940. This application May 8, 1945, Serial No. 592,588

1 Claim. (Cl. 220—24)

This invention relates to covers for tin cans and has for an object to provide a cover for hermetically sealing tin cans so that they can be used over and over again for canning especially in the home and restaurants where long transportation of the canned goods is not required.

A further object is to provide a cover which may be more conveniently applied than conventional covers requiring hand capping machines or soldering and which will be inexpensive to manufacture.

A further object is to provide a canning tin can with a double bead at its top—one inner, and one outer bead, and a layer of metal connecting integrally the two beads for reinforcement with a minimum of prominence, and to provide preferably a removable rubber sealing gasket between inner bead and layer of can and cover to hermetically seal the can.

With the above and other objects in view, the invention consists of certain novel details of construction and combinations of parts hereinafter fully described and claimed, it being understood that various modifications may be had without departing from the spirit or sacrificing any of the advantages of the invention.

In the accompanying drawing forming part of this specification,

Fig. 1 is a plan view of a canning can cover constructed in accordance with the invention, in applied position.

Fig. 2 is a cross sectional view taken on the line 2—2 of Fig. 1.

Fig. 3 is a top view of collar sectionally visible in Fig. 2.

Fig. 4 is a gasket to be placed between cover, and inner bead and top layer of can.

Fig. 5 is a modified form of fastening collar of Fig. 3.

To provide a canning tin can in my invention one must first procure a can which has been hermetically sealed at both ends in the regular way by canning machines and then preferably with a disc cutter, cut off the cover internally near the top edge of the can so as to leave a thin strip of metal sheeting enclosing the edge of the can and forming a peripheral bead on the open end thereof having a transversely curved top surface and its lower portion terminating in an inner peripheral shoulder and an outer peripheral shoulder on the inner and outer faces respectively of the body of the can—with a bead at its top formed by a layer of metal enclosing the edge of the can for reinforcement with a minimum of prominence.

Referring now to the drawing in which like characters of reference designate similar parts in the various views, 1 designates a circumferentially flexible ring or collar preferably made of thin metal sheeting in one or more parts with a plurality of U-shaped loops or clips 3 of thin (flat) metal sheeting preferably spot welded at a right angle to surface of ring and integral to it as best seen in Fig. 3 and having its ends outwardly bent 4 and perforated 5 to receive threaded bolt 6 with threaded nut for said bolt. A modified form of fastening collar 1 is shown in Fig. 5 in providing horizontal-to-ring loops 15 in place of perforations 5 to receive threaded bolt 16 with threaded nut. After placing ring 1 around near top of can 7, the bolt 6 is placed in perforations 5 and the nut of bolt 6 tightened just enough so the ring 1 will abut firmly against outer shoulder 8 of can without slipping.

The cover 9 is in the form of a disc having a struck-up circularly partly rounded channel 10 to be approximately in line with circular top of special layer on top of can 7 when cover is in position. Said cover has a thin depending circular flange 11 a short distance but far enough from outer edge of channel 10 to be outside of can instead of inside when cover is applied and providing more room in the can; said flange is also used to hold in place preferably a circular flat rubber gasket 12 before pressure is applied to cover 9. Said cover also has a horizontally extended circular rim 13 perforated to receive threaded bolts 14 with threaded nuts to fit. The bolts 14 are placed in perforations in extension cover 13 and through loops 3 of ring 1, and by tightening nuts for said bolts, the gasket 12 is compressed between cover, and inner bead and top layer of can to hermetically seal the can.

This application is a substitute for my abandoned application Serial Number 324,918, filed March 20, 1940.

What I claim is:

In combination a conventional cylindrical tin can which has been opened by severing an end wall from the inner periphery of the beaded edge of the can, said beaded edge forming for said can at the open end thereof a transversely curved terminal edge and an external peripheral shoulder closely adjacent thereto, a device for closing the open end of said can comprising a rigid metal plate secured to the open end of the can and closing said opening, said plate having formed therein a relatively deep channel substantially semicircular in cross section and receiving therein the said bead of the can, a sealing gasket positioned in said channel and substantially enclosing the bead, means for clamping said plate in sealing engagement with said gasket and bead, said means comprising a split ring clamped about the body of the can in abutting engagement with said shoulder, said ring having rigidly secured thereto spaced outwardly projecting ears, said plate having means outwardly of said channel for receiving clamping bolts which cooperate with said ears to clamp the plate into sealing engagement with the end of said can, said metal plate having a depending concentric flange spaced a definite distance outwardly of said channel to temporarily hold the gasket during the mounting of said plate in operative position.

HENRY CLEMENT DAUPHINAIS.